United States Patent
Zisman et al.

(10) Patent No.: US 9,553,904 B2
(45) Date of Patent: Jan. 24, 2017

(54) AUTOMATIC PRE-PROCESSING OF MODERATION TASKS FOR MODERATOR-ASSISTED GENERATION OF VIDEO CLIPS

(71) Applicant: Wochit, Inc., New York, NY (US)

(72) Inventors: Guy Zisman, Ramat-Gan (IL); Eitan Lavi, Tel Aviv (IL); Amotz Hoshen, Tel-Aviv (IL)

(73) Assignee: Wochit, Inc., New York, NY (US)

( * ) Notice: Subject to any disclaimer, the term of this patent is extended or adjusted under 35 U.S.C. 154(b) by 421 days.

(21) Appl. No.: 14/214,964

(22) Filed: Mar. 16, 2014

(65) Prior Publication Data
US 2015/0262080 A1 Sep. 17, 2015

(51) Int. Cl.
*H04L 29/06* (2006.01)
*G06Q 10/00* (2012.01)
*H04L 12/18* (2006.01)

(52) U.S. Cl.
CPC .......... *H04L 65/4069* (2013.01); *G06Q 10/00* (2013.01); *H04L 12/1822* (2013.01)

(58) Field of Classification Search
None
See application file for complete search history.

(56) References Cited

U.S. PATENT DOCUMENTS

| | | |
|---|---|---|
| 6,085,201 A | 7/2000 | Tso |
| 6,744,968 B1 | 6/2004 | Imai et al. |
| 2002/0003547 A1 | 1/2002 | Wang et al. |
| 2002/0042794 A1 | 4/2002 | Konaka |
| 2004/0111265 A1 | 6/2004 | Forbes |
| 2006/0041632 A1 | 2/2006 | Shah |
| 2006/0149558 A1 | 7/2006 | Kahn et al. |
| 2006/0212421 A1 | 9/2006 | Oyarce |
| 2006/0274828 A1 | 12/2006 | Siemens et al. |
| 2006/0277472 A1 | 12/2006 | Yodo et al. |
| 2007/0244702 A1 | 10/2007 | Kahn et al. |
| 2008/0033983 A1 | 2/2008 | Ko |
| 2008/0104246 A1 | 5/2008 | Katz et al. |
| 2008/0270139 A1 | 10/2008 | Shi |
| 2008/0281783 A1 | 11/2008 | Papkoff et al. |
| 2009/0169168 A1 | 7/2009 | Ishikawa |
| 2010/0061695 A1 | 3/2010 | Furmanski et al. |
| 2010/0153520 A1 | 6/2010 | Daun et al. |
| 2010/0180218 A1 | 7/2010 | Boston et al. |
| 2010/0191682 A1 | 7/2010 | Takamatsu |
| 2011/0109539 A1 | 5/2011 | Wu et al. |
| 2011/0115799 A1 | 5/2011 | Imbruce |
| 2013/0294746 A1 | 11/2013 | Oz et al. |

(Continued)

OTHER PUBLICATIONS

U.S. Appl. No. 13/874,496 Office Action dated Jan. 21, 2016.

(Continued)

*Primary Examiner* — Alan Chen
(74) *Attorney, Agent, or Firm* — D.Kligler IP Services Ltd.

(57) ABSTRACT

A method includes defining multiple moderation tasks, which originate from respective textual articles that are to be automatically converted into respective video clips following moderation by human moderators. The moderation tasks are pre-processed, so as to predict success measures of the corresponding video clips. Delivery of the moderation tasks to the human moderators is prioritized based on the predicted success measures.

21 Claims, 2 Drawing Sheets

(56) References Cited

U.S. PATENT DOCUMENTS

2014/0147095 A1    5/2014  Oz et al.
2015/0081696 A1*   3/2015  Ogawa ............. G06F 17/30595
                                                    707/736

OTHER PUBLICATIONS

U.S. Appl. No. 14/170,621 Office Action dated Dec. 8, 2015.
U.S. Appl. No. 13/874,496 Office Action dated Jul. 7, 2015.
U.S. Appl. No. 13/874,496 Office Action dated Jul. 15, 2016.

* cited by examiner

AUTOMATIC PRE-PROCESSING OF MODERATION TASKS FOR MODERATOR-ASSISTED GENERATION OF VIDEO CLIPS

FIELD OF THE INVENTION

The present invention relates generally to multimedia generation, and particularly to methods and systems for semi-automatic generation of multimedia content.

SUMMARY OF THE INVENTION

An embodiment of the present invention that is described herein provides a method including defining multiple moderation tasks, which originate from respective textual articles that are to be automatically converted into respective video clips following moderation by human moderators. The moderation tasks are pre-processed, so as to predict success measures of the corresponding video clips. Delivery of the moderation tasks to the human moderators is prioritized based on the predicted success measures.

In some embodiments, pre-processing the moderation tasks includes predicting respective likelihoods that the human moderators will not reject the moderation tasks, and prioritizing the delivery includes prioritizing the moderation tasks based on the likelihoods. In some embodiments, pre-processing the moderation tasks includes classifying the moderation tasks into two or more classes, and prioritizing the delivery includes prioritizing the moderation tasks so as to provide the human moderators at least a predefined number of tasks of each class. The classes may include at least one class type selected from a group of types consisting of clients associated with the moderation tasks, moderator types associated with the moderation tasks, topics associated with the moderation tasks, and textual-article feeds associated with the moderation tasks.

In some embodiments, defining the moderation tasks includes grouping at least some of the moderation tasks in moderation batches, each moderation batch containing the moderation tasks originating from a respective textual article, and pre-processing the moderation tasks includes predicting the success measures per moderation batch. Prioritizing the delivery may include prioritizing each moderation batch depending on a respective number of the moderation tasks in the moderation batch.

In some embodiments, pre-processing the moderation tasks includes assessing a newsworthiness of the respective textual articles, and prioritizing the delivery includes prioritizing the moderation tasks based on the newsworthiness of the textual articles. In an embodiment, assessing the newsworthiness includes assessing at least one property selected from a group of properties consisting of popularity, uniqueness, recentness and trendiness of the textual articles. In another embodiment, assessing the newsworthiness includes quantifying the newsworthiness by analyzing social-network traffic. In an embodiment, prioritizing the delivery includes combining two or more different types of the success measures to produce respective priority ranks for the moderation tasks.

There is additionally provided, in accordance with an embodiment of the present invention, apparatus including a processor and an interface. The processor is configured to define multiple moderation tasks that originate from respective textual articles to be automatically converted into respective video clips following moderation by human moderators, to pre-process the moderation tasks so as to predict success measures of the corresponding video clips, and to prioritize delivery of the moderation tasks to the human moderators based on the predicted success measures. The interface is configured to deliver the prioritized moderation tasks to the human moderators.

There is further provided, in accordance with an embodiment of the present invention, computer software product, including a non-transitory computer-readable medium in which program instructions are stored, which instructions, when read by a computer, cause the computer to define multiple moderation tasks that originate from respective textual articles to be automatically converted into respective video clips following moderation by human moderators, to pre-process the moderation tasks so as to predict success measures of the corresponding video clips, to prioritize delivery of the moderation tasks to the human moderators based on the predicted success measures, and to deliver the prioritized moderation tasks to the human moderators.

The present invention will be more fully understood from the following detailed description of the embodiments thereof, taken together with the drawings in which:

DETAILED DESCRIPTION OF EMBODIMENTS

Overview

Figure 1:
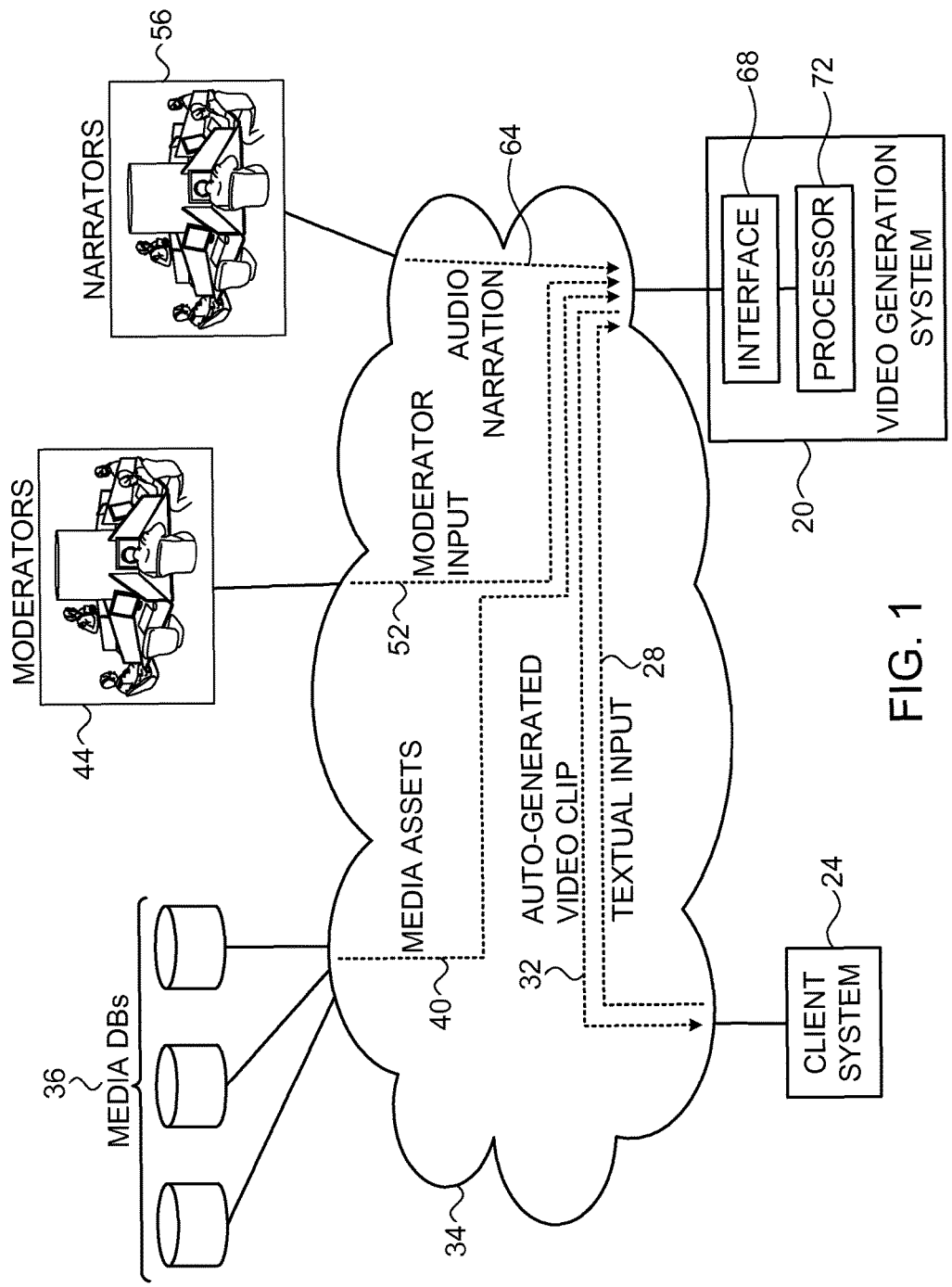
FIG. 1 is a block diagram that schematically illustrates a system for semi-automatic generation of video clips, in accordance with an embodiment of the present invention.

Embodiments of the present invention that are described herein provide improved methods and systems for generating multimedia content. In the disclosed embodiments, a video generation system receives textual articles from which respective video clips are to be generated. The articles may relate, for example, to entertainment, business, technology, general news or any other topic. The system generates video clips based on the articles using a semi-automatic, human-assisted process.

In a typical flow, the system automatically retrieves media assets (e.g., images, video excerpts, social-network information or Web pages) that contextually match a given article. The system ranks and filters the media assets according to their relevance to the article, and presents the resulting collection of media assets to a human moderator. The information presented to a moderator with regard to a given article is referred to herein as a moderation task.

The moderator has the option of rejecting or accepting the moderation task. If the task is accepted, the moderator selects media assets that will appear in the video clip, and possibly directs the system to correlate certain media assets in time with the text or with an audio narration of the text. Following the moderation stage, the system generates the video clip automatically using the audio narration and the selected media assets, in accordance with the moderator input.

Further aspects of semi-automatic video clip generation are addressed in U.S. patent application Ser. No. 14/170,621, filed Feb. 2, 2014, which is assigned to the assignee of the present patent application and whose disclosure is incorporated herein by reference.

The video generation system usually operates on a mass scale and under demanding time constraints. The system typically processes a large number of articles at any given time, and uses a pool of moderators before completing the video-clip generation process. In practice, however, the number of human moderators is often insufficient for handling all the articles provided to the system. Moreover, the human moderation time is a major factor in the cost and time of producing the video clips. Therefore, it is important to utilize the human moderators as efficiently as possible.

The methods and systems described herein pre-process the moderation tasks before they are provided to the moderators, in an attempt to optimize the use of the available human moderator resources. In some embodiments, the system predicts various measures of success relating to the moderation tasks, and filters and prioritizes the moderation tasks in accordance with the predicted success measures.

In various embodiments, the system considers various types of success measures. Some success measures predict the likelihood that a moderation task will survive the moderation stage successfully, i.e., will not be rejected by the moderator. Other success measures assist the system in meeting its yield targets and avoid "starvation" scenarios (e.g., starvation of moderators of a given type, of article sources, of a given client or of a certain topical area). Some success measures predict the newsworthiness, level of interest, uniqueness or trendiness of the article or video clip. Other success measures give higher weight to moderation tasks whose output is usable for multiple video clips and clients.

Various examples of success measures, and ways of calculating them, are described herein. Some success measures are estimated by analyzing the moderation task information, such as the article text and media assets. Other success measures are assessed using external sources, such as by monitoring relevant social-network traffic.

In summary, the methods and systems described herein prioritize the moderation tasks in accordance with their chances of success. Moderation tasks that are less likely to survive moderation, or to produce valuable video clips, are discarded or given low priority. As a result, human moderation resources are used efficiently, and both quantity and quality of the generated video clips are improved.

System Description

FIG. 1 is a block diagram that schematically illustrates a system 20 for semi-automatic generation of video clips, in accordance with an embodiment of the present invention. System 20 receives textual articles, also referred to as textual inputs 28, and generates respective video clips 32 based on the textual inputs. The textual inputs may comprise, for example, articles relating to entertainment, business, technology, general news or any other suitable topics.

In the example of FIG. 1, system 20 receives the textual inputs from a client system 24, and returns the video clips to the client system. A video generation system of this sort may be used, for example, for providing a publisher with video clips based on textual articles received from the publisher. System 20 communicates with client system 24 over a communication network 34, e.g., the Internet. In alternative embodiments, however, system 20 may obtain textual inputs from any other suitable source and deliver video clips to any other suitable destination. System 20 can thus be used in a variety of business models and modes of operation. The client systems are also referred to herein as clients, for simplicity.

Additional details of the video generation process performed by system 20 are addressed in U.S. patent application Ser. No. 14/170,621, cited above. Generally, system 20 communicates over network 34 with one or more media databases (DBs) 36 so as to retrieve media assets 40 that are related to a given textual input. The media assets are also referred to as media items, and may comprise, for example, video and/or audio excerpts, still images, Web-page snapshots, maps, graphs, graphical elements, social network information, and many others. Media DBs 36 may comprise, for example, content Web sites, social-network servers or any other suitable database.

System 20 presents the textual input and the corresponding automatically-retrieved media assets to a human moderator 44. The information presented to the moderator with regard to a given textual input (article) is referred to as a moderation task. System 20 typically uses multiple moderators 44 for handling a large throughput of textual inputs and video clips simultaneously. In a given moderation task, moderator 44 reviews and selects media assets that will be included in the video clip, and arranges the media assets so as to correlate in time to the timing of the textual input. The moderator thus produces moderator input 52, which is fed back to system 20 over network 34.

In addition to moderator input 52, system 20 further receives audio narration 64 of the textual input in question. The audio narration is produced by a narrator 56 and provided to system 20 over network 34. System 20 typically uses multiple narrators 56 for narrating the various textual inputs.

Based on moderator input 52 and audio narration 64, system 20 automatically produces video clip 32. Video clip 32 is delivered over network 34 to client system 24. In some embodiments, the automatically-generated video clip is verified by one of moderators 44 before delivery to client system 24. Audio narration 64 is also optionally verified for quality by moderator 44.

In the example of FIG. 1, system 20 comprises an interface 68 for communicating over network 34, and a processor 72 that carries out the methods described herein. The system configuration shown in FIG. 1 is an example configuration, which is chosen purely for the sake of conceptual clarity. In alternative embodiments, any other suitable system configuration can be used.

The elements of system 20 may be implemented using hardware/firmware, such as in an Application-Specific Integrated Circuit (ASIC) or Field-Programmable Gate Array (FPGA), using software, or using a combination of hardware/firmware and software elements. In some embodiments, processor 72 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Client Types and Moderation Batches

In some embodiments, system 20 provides video clips to multiple client systems (referred to simply as clients). Different clients may have different requirements and specifications for the video clips. For example, a client may specify the narration language, info-graphics language, the length of the narrated text, the type of human moderators to be used, and/or various other specifications. Moreover, different clients may have different priorities and privileges in the system.

In an example implementation, each client is defined as a Level-I, Level-II, Level-III or Level-IV client. A Level-I client is provided with "standard" video clips produced by system 20, without any specific adaptation to client-specific requirements. A Level-III client is provided with a dedicated process of video-clip generation, which may include, for example, dedicated access to moderators 44. A Level-IV client is provided with a dedicated process of video-clip generation, which may comprise dedicated control of article triggering and editing, and dedicated access to the moderators. A Level-IV client may, for example, select and track its own moderation tasks. In alternative embodiments, any other suitable client classification can be used.

In some embodiments, at least some of the moderation tasks are groups in "moderation batches." Each moderation batch comprises two or more moderation tasks that originate from the same article and are destined to different respective clients. The moderation tasks in a given batch may differ from one another, for example, because the different clients may be of different types or have different specifications.

In an embodiment, each moderation task in a batch has client-invariant parameters and client-specific parameters. Client-invariant parameters may comprise, for example, feed, author, category, social-media popularity scores, story hotness scores, topics, or any other suitable parameter. Client-specific parameters may comprise, for example, the client identity, narrated text length, the actual narrated text, media ranking scores per the narrated text, or any other suitable parameter.

In various embodiments, the moderation tasks of a given moderation batch may share some or even all parts of the video clip generation process. For example, if two tasks in a batch share the same narration text but not the same narration language and translation (or if one of the clients specifies his own in-house talent to perform the narration), these tasks may share the asset moderation task but not the narration task or the narration-moderation task. In some embodiments, processor 72 selects a representative task from each batch to be provided for moderation, and the other tasks in the batch are accepted or rejected based on whether the representative task is accepted or rejected by the moderator.

Pre-Processing of Moderation Tasks

In some embodiments, processor 72 pre-processes the moderation tasks before they are delivered to moderators for moderation. The underlying assumption is that moderators 44 are unable to process the entire volume of moderation tasks, and therefore some moderation tasks will inevitably be discarded. The purpose of the pre-processing phase is to filter-out and prioritize the moderation tasks, such that tasks having the highest predicted measure of success will be presented first to the moderators.

In some embodiments, processor 72 prioritizes moderation batches rather than individual moderation tasks. In such embodiments, processor 72 typically selects a representative task from each batch and prioritizes it using the disclosed techniques. The other moderation tasks in the batch are processed in accordance with the priority assigned to the representative task. The description that follows refers generally to prioritization of moderation tasks, which may comprise individual tasks and/or representative tasks selected from respective moderation batches.

Processor 72 may use various kinds of success measures and various methods to predict them. Several examples are described below. Alternatively, however, processor 72 may use any other suitable success measure and/or prediction method. The description that follows refers mainly to prioritization of the moderation tasks. In the context of the present patent application and in the claims, however, the term "prioritization" is used in a broad sense and refers also, for example, to filtering-out or discarding of moderation tasks. In other words, pre-filtering of moderation tasks is viewed as a kind of prioritization, in which tasks that do not reach a certain predicted measure of success are discarded.

In the examples below, processor 72 prioritizes a given moderation task by considering the media assets that were automatically retrieved for that task, possibly in combination with the original textual article. Generally, however, processor 72 may prioritize the moderation tasks based on the article, media assets, audio narration, and/or any suitable subset of these elements.

In the examples below, processor 72 prioritizes the moderation tasks after the automatic process of retrieving, filtering and ranking the media assets is complete, i.e., when the tasks are ready for moderation. Alternatively, however, processor 72 may prioritize moderation tasks at any suitable stage prior to moderation. For example, prioritization may be carried out on the basis of the textual articles alone, before or in parallel with fetching or processing of media assets.

In some embodiments, processor 72 prioritizes the moderation tasks in accordance with their predicted likelihoods of surviving the human moderation stage. In other words, processor 72 predicts the likelihood that a given moderation task will not be rejected by the moderator, and prioritizes the task accordingly.

Processor 72 may use various criteria to estimate whether a moderation task is likely to pass or fail the human moderation stage. For example, a task that is similar to one or more tasks that have previously failed moderation is likely to fail, as well. Processor 72 may measure the similarity between moderation tasks based on, for example, contextual similarity (or identicality), and/or media asset similarity (or identicality).

In an embodiment, processor 72 may estimate the likelihood of a moderation task to survive moderation using a machine learning algorithm. In this embodiment, processor 72 assigns the task a score, which considers factors such as the task parameters, correlation scores between the article and the corresponding media assets, various media quality ranks, or other suitable parameters, and outputs a probability of moderation success. The algorithm may be trained using past examples of tasks that have passed or failed the moderation stage. Such an algorithm may reliably predict the chances of a task surviving human moderation without being rejected due to lack of adequate-quality media or other reasons.

In some embodiments, processor 72 classifies the moderation tasks into classes, and prioritizes the moderation tasks such that the moderators receive a fair share of moderation tasks of each class.

An example classification is by client, e.g., processor 72 may prioritize the moderation tasks so as to provide the moderators with a sufficient number of moderation tasks relating to each client. The number or share of tasks for each client may be defined, for example, to prevent starvation vis-à-vis a particular client or to meet a desired distribution of the tasks among the clients. For example, the system may define priorities among the clients, and prioritize the tasks such that the moderators receive a higher ratio of moderation tasks relating to higher priority clients, and vice versa.

Another example classification is by moderator type. In some cases, the pool of moderators comprises moderators 44 of different types, e.g., of different languages, genres or topical areas of expertise, quality levels and skill-sets, or other suitable classification. In some embodiments, processor 72 prioritizes the moderation tasks per moderator type, e.g., such that each class of moderators receives its fair share of moderation tasks and no class of moderators is starved of tasks to moderate.

Yet another possible classification is by feed. In some embodiments, system 20 receives textual articles from multiple sources (e.g., news sites or any other suitable source) that are referred to as feeds. In an embodiment, processor 72 prioritizes the moderation tasks so as to make sufficient use of each feed and avoid starvation of any given feed. Another possible classification is by topic. For example, processor 72 may prioritize the moderation tasks such that the moderators receive a sufficient number of tasks of each topic (e.g., news, entertainment or business) and so as to avoid starvation in any given topic.

Processor 72 may prioritize the moderation tasks in accordance with any of the above classifications, or using a combination of multiple classifications, or using any other suitable classification. In these embodiments, the success measures used for prioritizing the moderation tasks comprise, for example, target ratios among the various classes or avoidance of starvation of a given class.

In some embodiments, processor 72 prioritizes the moderation tasks in accordance with the sizes of their moderation batches. Typically, a moderation task selected from a large batch (that contains a large number of moderation tasks originating from the same article) will receive a higher priority than a task selected from a small moderation batch. The rationale behind this criterion is increased yield: A task belonging to a large moderation batch will translate into a large number of video clips using only a single human moderation session. In other words, the measure of success in these embodiments is the number of video clips produced from the same moderation task.

In some embodiments, the success measures relate to the newsworthiness of the moderation task. In these embodiments, processor 72 estimates the level of newsworthiness of the various articles, and assigns higher priorities to moderation tasks of highly newsworthy articles. Moderation tasks of articles that are less newsworthy are assigned low priority or discarded.

Processor 72 may assess the newsworthiness of an article by estimating its social-network popularity, trendiness, uniqueness or other suitable measure. In some embodiments, processor 72 predicts the newsworthiness of a moderation task by monitoring social-network traffic in real time and checking for such measures. For example, processor 72 may find that a certain article is currently being shared extensively, or commented on (e.g., "liked" or "retweeted") extensively, and in response prioritizes the corresponding moderation task as highly newsworthy.

As another example, if analysis of the social-network traffic indicates that a certain article relates to a topic that is currently undergoing a statistically-significant sentiment shift, processor 72 may prioritize the respective moderation task as highly newsworthy. Yet another way of assessing newsworthiness is to measure the recentness of the moderation tasks. In such an embodiment, processor 72 assigns higher priority to moderation tasks of more recent articles, and vice versa.

In an example embodiment, processor 72 estimates the real-time "hotness" of an article on the Twitter social network using the following scheme: Immediately before prioritization of the moderation tasks, processor 72 samples the Twitter Application Programming Interface (API) and obtains two measures. The first measure is the time that elapsed since the first tweet that references the article's title. The second measure is the number of tweets that have referenced the article's title. The first-level gradient of these measures serves as a "hotness" metric for both newness (time lag between the first social-media appearance and readiness for moderation), and social media traction.

In another example embodiment, processor 72 estimates the Google Videos uniqueness—A measure of current videos worldwide reflecting the content of the textual article in question. The rationale behind this metric is that it is more lucrative to produce a video clip for an article or topic having little current video representation. In yet another example embodiment, processor 72 carries out trending topics analysis and sentiment event analysis, so as to assess the "hotness" of the topics depicted in the article or moderation task. Further alternatively, processor 72 may assess the newsworthiness of articles in any other suitable way. In some embodiments, processor 72 uses machine learning techniques to estimate the likelihoods that moderation tasks will survive asset moderation. For example, machine-learning classifiers may be trained on various parameters that are indicative of media-asset quality of the articles. The classifiers may be trained to predict the success of the asset moderation process based on a-priori machine-generated relevancy scores of the media assets, e.g., entity-relevance, metadata-text-relevance, actuality-relevance, date-relevance and/or any other suitable scores, as well as the distribution of these scores vs. the length of the article (and thus the video time that needs to be filled with quality assets). In an example embodiment, processor 72 uses the likelihoods estimated by the machine learning (likelihoods that moderation tasks survive asset moderation), possibly in combination with other factors (e.g., social media, hotness measures) to set the priorities of specific tasks to be handed to a moderator.

The success measures and success, prediction methods and prioritization methods described above are depicted purely by way of example. In alternative embodiments, processor 72 may use any other suitable success measures of the video clips or articles, any other suitable prediction scheme, and/or any other suitable prioritization scheme.

Figure 2:
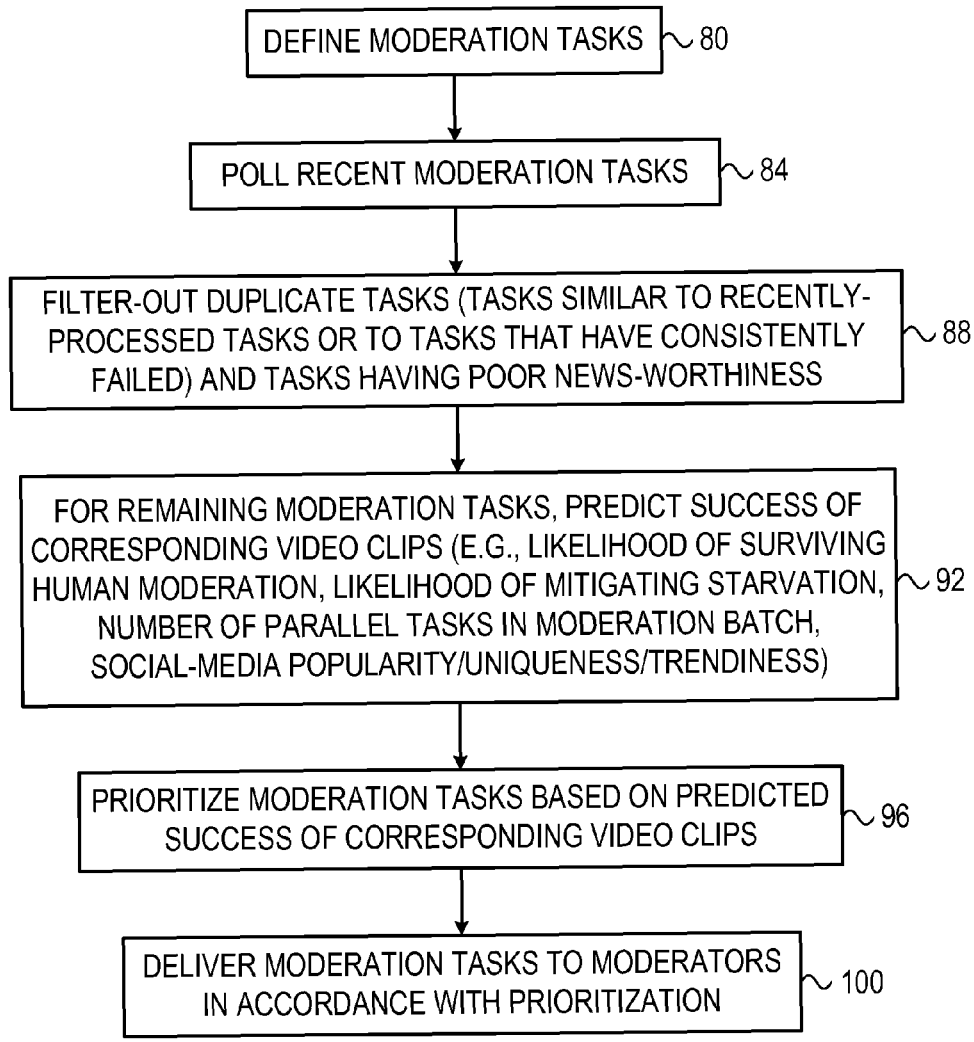
FIG. 2 is a flow chart that schematically illustrates a method for pre-processing moderation tasks, in accordance with an embodiment of the present invention.

FIG. 2 is a flow chart that schematically illustrates a method for pre-processing moderation tasks, in accordance with an embodiment of the present invention. The method begins with processor 72 defining moderation tasks based on incoming articles that are to be converted to video clips, at a task definition step 80. In an embodiment, processor 72 groups at least some of the moderation tasks into moderation batches.

Processor 72 polls the recent moderation tasks, at a polling step 84. In an example embodiment, processor 72 polls the moderation tasks for the articles received during the last N minutes. As a fallback mechanism, if the number of articles received during the last N minutes is too small, processor 72 may revert to poll the moderation tasks for the articles received during the last N·X1 minutes, then during the last N·X2 minutes, and so on (wherein X1, X2, . . . are progressively increasing integers).

In some embodiments, the polling operation is moderator-driven. In these embodiments processor 72 polls the most recent moderation tasks in response to a moderator requesting a new moderation task. In some embodiments, the moderators are divided a-priori into moderator groups having different characteristics (e.g., languages or other skill-sets). In these embodiments, processor 72 may buffer the moderation tasks in buffers that correspond to the moderator groups. In response to a request from a moderator, processor 72 polls the recent moderation tasks in the buffer of the moderator group to which the requesting moderator belongs.

At a filtering step 88, processor 72 discards duplicate moderation tasks and/or tasks having poor newsworthiness. For example, processor 72 may discard a candidate moderation task that is similar to one or more other tasks that have been recently converted into video clips, or a candidate moderation task that is similar to one or more other tasks that have consistently failed moderation.

For example, processor 72 may poll the moderation tasks that have already proceeded to the human moderation stage over the last M minutes (and may have succeeded or failed). The processor compares the candidate moderation task to the polled tasks in terms of contextual similarity and media similarity. Similarity may be measured using various metrics, such as textual similarity, contextual similarity and media similarity, possibly considering the time delay between the tasks and possibly cross-referencing the different similarity metrics.

In some embodiments, a given client may have a specific definition for identifying and discarding duplicate moderation tasks. Such a definition may specify, for example, conditions of uniqueness and similarity, frequencies of previous similar tasks that warrant discarding or acceptance, to name just a few examples. If no client-specific definition is available, a general definition can be used by default.

At a success prediction step 92, processor 72 predicts measures of success for the remaining moderation tasks (or of the video clips that evolve from the moderation tasks). Any of the success measures and prediction schemes described above can be used. For example, processor 72 may predict the likelihood of the tasks surviving moderation, the likelihood of meeting predefined yield targets per client, feed or topic, the newsworthiness as demonstrated by social-network popularity/uniqueness/trendiness, or other suitable measure or combination of measures.

At a prioritization step 96, processor 72 prioritizes the moderation tasks in accordance with the predicted success measures. At a delivery step 100, processor 72 delivers moderation tasks to moderators 44 in accordance with the assigned priorities.

Although the embodiments described herein mainly address moderator-assisted generation of video clips, the methods and systems described herein can also be used in other applications that optimize human involvement in a semi-automatic process by predicting tasks that are more likely to be successful under certain constraints.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
defining multiple moderation tasks, which originate from respective textual articles that are to be automatically converted into respective video clips following moderation by human moderators;
automatically retrieving a plurality of media assets that contextually match the respective textual article, for each of the defined moderation tasks;
pre-processing the moderation tasks so as to predict likelihoods that the human moderators will not reject the moderation tasks, based on a comparison of the moderation tasks to past examples of tasks that passed or failed a moderation stage; and
prioritizing delivery of the moderation tasks to the human moderators based on the predicted likelihoods.

2. The method according to claim 1, wherein pre-processing the moderation tasks comprises classifying the moderation tasks into two or more classes, and wherein prioritizing the delivery comprises prioritizing the moderation tasks so as to provide the human moderators at least a predefined number of tasks of each class.

3. The method according to claim 2, wherein the classes comprise at least one class type selected from a group of types consisting of clients associated with the moderation tasks, moderator types associated with the moderation tasks, topics associated with the moderation tasks, and textual-article feeds associated with the moderation tasks.

4. The method according to claim 1, wherein defining the moderation tasks comprises grouping at least some of the moderation tasks in moderation batches, each moderation batch containing the moderation tasks originating from a respective textual article, and wherein pre-processing the moderation tasks comprises predicting the likelihoods per moderation batch.

5. The method according to claim 4, wherein prioritizing the delivery comprises prioritizing each moderation batch depending on a respective number of the moderation tasks in the moderation batch.

6. The method according to claim 1, wherein pre-processing the moderation tasks comprises assessing a newsworthiness of the respective textual articles, and wherein prioritizing the delivery comprises prioritizing the moderation tasks based on the newsworthiness of the textual articles.

7. The method according to claim 6, wherein assessing the newsworthiness comprises assessing at least one property selected from a group of properties consisting of popularity, uniqueness, recentness and trendiness of the textual articles.

8. The method according to claim 6, wherein assessing the newsworthiness comprises quantifying the newsworthiness by analyzing social-network traffic.

9. The method according to claim 1, wherein prioritizing the delivery comprises combining two or more different types of the likelihoods to produce respective priority ranks for the moderation tasks.

10. The method according to claim 1, wherein pre-processing the moderation tasks comprises comparing the moderation tasks and the past examples of tasks based on similarity of the retrieved media assets of the tasks.

11. The method according to claim 1, wherein pre-processing the moderation tasks comprises providing each moderation task with a score of a correlation between the textual article of the moderation task and the media assets retrieved for the moderation task.

12. The method according to claim 1, wherein pre-processing the moderation tasks comprises providing each moderation task with a score assigned by a machine learning algorithm trained by past examples of tasks.

13. An apparatus, comprising:
a processor, which is configured to define multiple moderation tasks that originate from respective textual articles to be automatically converted into respective video clips following moderation by human moderators, to automatically retrieve a plurality of media assets that contextually match the respective textual article, for each of the defined moderation tasks, to pre-process the moderation tasks so as to predict likelihoods that the human moderators will not reject the moderation tasks, based on a comparison of the moderation tasks to past examples of tasks that passed or failed a moderation stage, and to prioritize delivery of the moderation tasks to the human moderators based on the predicted likelihoods; and
an interface, which is configured to deliver the prioritized moderation tasks to the human moderators.

14. The apparatus according to claim 13, wherein the processor is configured to classify the moderation tasks into two or more classes, and to prioritize the moderation tasks so as to provide the human moderators at least a predefined number of tasks of each class.

15. The apparatus according to claim 14, wherein the classes comprise at least one class type selected from a group of types consisting of clients associated with the moderation tasks, moderator types associated with the moderation tasks, topics associated with the moderation tasks, and textual-article feeds associated with the moderation tasks.

16. The apparatus according to claim 13, wherein the processor is configured to group at least some of the moderation tasks in moderation batches, each moderation batch containing the moderation tasks originating from a respective textual article, and to predict the likelihoods per moderation batch.

17. The apparatus according to claim 16, wherein the processor is configured to prioritize each moderation batch depending on a respective number of the moderation tasks in the moderation batch.

18. The apparatus according to claim 13, wherein the processor is configured to assess a newsworthiness of the respective textual articles, and to prioritize the moderation tasks based on the newsworthiness of the textual articles.

19. The apparatus according to claim 18, wherein the processor is configured to assess the newsworthiness by assessing at least one property selected from a group of properties consisting of popularity, uniqueness, recentness and trendiness of the textual articles.

20. The apparatus according to claim 18, wherein the processor is configured to quantify the newsworthiness by analyzing social-network traffic.

21. A computer software product, comprising a non-transitory computer-readable medium in which program instructions are stored, which instructions, when read by a computer, cause the computer to define multiple moderation tasks that originate from respective textual articles to be automatically converted into respective video clips following moderation by human moderators, to automatically retrieve a plurality of media assets that contextually match the respective textual article, for each of the defined moderation tasks, to pre-process the moderation tasks so as to predict likelihoods that the human moderators will not reject the moderation tasks, based on a comparison of the moderation tasks to past examples of tasks that passed or failed a moderation stage, to prioritize delivery of the moderation tasks to the human moderators based on the predicted likelihoods, and to deliver the prioritized moderation tasks to the human moderators.

* * * * *